United States Patent
Fan et al.

(10) Patent No.: US 8,926,931 B2
(45) Date of Patent: Jan. 6, 2015

(54) COST-EFFECTIVE CATALYST FOR GASIFICATION OF POWDER RIVER BASIN COAL

(76) Inventors: Maohong Fan, Ames, IA (US); Morris Argyle, Provo, UT (US); Tiberiu Popa, Laramie, WY (US)

(*) Notice: Subject to any disclaimer, the term of this patent is extended or adjusted under 35 U.S.C. 154(b) by 0 days.

(21) Appl. No.: 13/566,492

(22) Filed: Aug. 3, 2012

(65) Prior Publication Data

US 2013/0032761 A1  Feb. 7, 2013

Related U.S. Application Data

(60) Provisional application No. 61/515,200, filed on Aug. 4, 2011.

(51) Int. Cl.
*C01B 31/18* (2006.01)
*C09K 3/00* (2006.01)
*C10J 3/00* (2006.01)

(52) U.S. Cl.
CPC .. *C10J 3/00* (2013.01); *Y02E 20/18* (2013.01); *C10J 2300/0906* (2013.01); *C10J 2300/093* (2013.01); *C10J 2300/0976* (2013.01); *C10J 2300/0986* (2013.01)
USPC .......... 423/410; 252/372; 423/418.2

(58) Field of Classification Search
None
See application file for complete search history.

(56) References Cited

U.S. PATENT DOCUMENTS

| 3,847,567 A | 11/1974 | Kalina et al. | |
| 4,318,712 A * | 3/1982 | Lang et al. | 48/202 |
| 4,551,155 A * | 11/1985 | Wood et al. | 48/197 R |
| 5,435,940 A * | 7/1995 | Doering et al. | 252/373 |
| 5,900,220 A * | 5/1999 | Allen | 423/179 |
| 2010/0287835 A1* | 11/2010 | Reiling et al. | 48/127.5 |

OTHER PUBLICATIONS

The ENCOAL (R) Mild Coal Gasification Project—A DOE Assessment U.S. Department of Energy—National Energy Technology Laboratory DOE/NETL-2002/1171; pp. 1-40 Mar. 2002.*
Beamish, et al., "Thermogravimetric determination of the carbon dioxide reactivity of char from some New Zealand coals and its association with the inorganic geochemistry of the parent coal," Fuel Processing Technology, Feb. 1998, vol. 53, Issue 3, pp. 243-253.
Bhatia, et al., "A random pore model for fluid-solid reactions: 1. Isothermal, kinetic control," AIChE Journal, May 1980, vol. 26, Issue 3, pp. 379-385.

(Continued)

*Primary Examiner* — Melvin C Mayes
*Assistant Examiner* — Douglas Call
(74) *Attorney, Agent, or Firm* — Patterson & Sheridan, LLP

(57) ABSTRACT

The present invention generally relates to a catalytic gasification of coal. Catalytic gasification of a Wyodak low-sulfur sub-bituminous coal from the Powder River Basin of Wyoming was investigated using an inexpensive sodium carbonate catalyst applied via incipient wetness impregnation. Experiments in an atmospheric pressure fixed-bed laboratory gasifier were performed to evaluate the effects of reaction temperature, feed gas steam content, and $Na_2CO_3$ loading on the catalytic gasification of the Wyodak coal. The temperature range investigated (700-900° C.) was selected with consideration of the $Na_2CO_3$ melting point (850° C.) to reduce the loss by volatilization of sodium. Sodium was found to be active during both pyrolysis and gasification steps. The catalyst was most cost-effective at addition levels of approximately 3 wt %. The random pore model provided a good fit to the conversion versus time data collected under both the catalytic and the uncatalytic conditions.

16 Claims, 14 Drawing Sheets
(12 of 14 Drawing Sheet(s) Filed in Color)

(56) References Cited

OTHER PUBLICATIONS

Boon, et al., "Water-Gas Shift Kinetics Over FeCr-based Catalyst: Effect of Hydrogen Sulphide," Catalysis Letters, 2009, vol. 131, Nos. 3-4, pp. 406-412.
Everson, et al., "Reaction kinetics of pulverized coal-chars derived from inertinite-rich coal discards: Gasification with carbon dioxide and steam," Fuel, May 2006, vol. 85, Issues 7-8, pp. 1076-1082.
Fung, et al., "Gasification kinetics of coals and wood," Korean Journal of Chemistry Engineering, 1990, vol. 7, No. 2, pp. 109-114.
Guldogan, et al., "Effects of Heating Rate and Particle Size on Pyrolysis Kinetics of Gediz Lignite," Energy Sources, 2002, vol. 24, Issue 8, pp. 753-760.
Huang, et al., "Kinetic studies of char gasification by steam and CO2 in the presence of H2 and CO," Fuel Processing Technology, Aug. 2010, vol. 91, Issue 8, pp. 843-847.
Jensen, et al., "The Kinetics of Gasification of Carbon Contained in Coal Minerals at Atmospheric Pressure," Industrial & Engineering Chemistry Process Design and Development, 1975, vol. 14, No. 3, pp. 308-314.
Kapteijn, et al., "CO2 gasification of carbon catalysed by alkali metals: Reactivity and mechanism," Fuel, Aug. 1984, vol. 63, Issue 8, pp. 1036-1042.
Kapteijn, et al., "CO2 gasification of activated carbon catalyzed by earth alkaline elements," AIChE Journal, Apr. 1986, vol. 32, Issue 4, pp. 691-695.
Kim, et al., "Thermal and Carbothermic Decomposition of Na2CO3 and Li2CO3," Metallurgical and Materials Transactions B, 2001, vol. 32, No. 1, pp. 17-24.
Kwon et al., "Reaction kinetics of CO2 carbonation with Mg-rich minerals," The Journal of Physical Chemistry A, 2011, 115(26), pp. 7638-7644.
Lang, et al., "Behaviour of calcium as a steam gasification catalyst," Fuel, Jul. 1982, vol. 61, Issue 7, pp. 620-626.
Li, "Some recent advances in the understanding of the pyrolysis and gasification behavior of Victorian brown coal," Fuel, Aug. 2007, vol. 86, Issues 12-13, pp. 1664-1683.
Li, et al., "Volatilization and catalytic effects of alkali and alkaline earth metallic species during the pyrolysis and gasification of Victorian brown coal. Part VI. Further investigation into the effects of volatile-char interactions," Fuel, 2004, 83, pp. 1273-1279.
Liu, et al., "Steam gasification of coal char using alkali and alkaline-earth metal catalysts," Fuel, Oct. 1986, vol. 65, Issue 10, pp. 1334-1338.
Matsuoka, et al., "Transformation of alkali and alkaline earth metals in low rank coal during gasification," Fuel, May 2008, vol. 87, Issue 6, pp. 885-893.
Meijer, et al., "Kinetics of the alkali-carbonate catalyzed gasification of carbon: 3. H2O gasification," Fuel, May 1994, vol. 73, Issue 5, pp. 723-730.
Mims, et al., "Role of surface salt complexes in alkali-catalyzed carbon gasification," Fuel, Feb. 1983, vol. 62, Issue 2, pp. 176-179.
Puig-Molina, et al., "The Cu Promoter in an Iron-Chromium-Oxide Based Water-Gas Shift Catalyst under Industrial Conditions Studied by in-Situ XAFS," The Journal of Physical Chemistry C, 2010, 114(36), pp. 15410-15416.
Quyn, et al., "Volatilisation and catalytic effects of alkali and alkaline earth metallic species during the pyrolysis and gasification of Victorian brown coal. Part IV. Catalytic effects of NaCl and ion-exchangeable Na in coal on char reactivity," Fuel, Mar. 2003, vol. 82, Issue 51, pp. 587-593.
Reddy, et al., "Cr- and Ce-Doped Ferrite Catalysts for the High Temperature Water-Gas Shift Reaction: TPR and Mossbauer Spectroscopic Study," The Journal of Physical Chemistry C, 2011, 115(4), pp. 920-930.
Roberts, et al., "Kinetics of Char Gasification with CO2 under Regime II Conditions: Effects of Temperature, Reactant, and Total Pressure," Energy & Fuels, 2010, 24(10), pp. 5300-5308.
Sawettaporn, et al., "CO2 gasification of Thai coal chars: Kinetics and reactivity studies," Korean Journal of Chemical Engineering, 2009, vol. 26, No. 4, pp. 1009-1015.
Sharma, et al., "Catalytic Steam Gasification Reactivity of HyperCoals Produced from Different Rank of Coals at 600-775°C.," Energy Fuels, 2008, 22(6), pp. 3561-3563.
Sun, et al., "CO2 and H2O Gasification Kinetics of a Coal Char in the Presence of Methane, " Energy & Fuels, 2008, vol. 22, Issue 4, pp. 2160-2165.
Tromp, et al., "Probing the influence of K2CO3- and Na2CO3-addition on the flash pyrolysis of a lignite and a bituminous coal with Curie-point pyrolysis techniques," Fuel, Jul. 1986, vol. 65, Issue 7, pp. 960-967.
Wu, et al., "Behavior of Mineral Matters in Chinese Coal Ash Melting during char-CO2/H20 Gasification Reaction," Energy Fuels, 2009, 23(5), pp. 2420-2428.
Zhang, et al., "CO2 separation by a new solid K—Fe sorbent," Energy & Fuels, 2011, 25(4), pp. 1919-1925.
Zhang, et al., "Modeling of catalytic gasification kinetics of coal char and carbon, " Fuel, Jan. 2010, vol. 89, Issue 1, pp. 152-157.
Zhang, et al., "Research on pyrolysis characteristics and kinetics of super fine and conventional pulverized coal," Energy Conversion and Management, Mar. 2007, vol. 48, Issue 3, pp. 797-802.
Zhu, et al., "Effect of the Coal Particle Size on Pyrolysis and Char Reactivity for Two Types of Coal and Demineralized Coal," Energy & Fuels, 2008, 22(4), pp. 2482-2487.
International Preliminary Report on Patentability dated Feb. 13, 2014 for Application No. PCT/US2012/049523.

\* cited by examiner

COST-EFFECTIVE CATALYST FOR GASIFICATION OF POWDER RIVER BASIN COAL

CROSS-REFERENCE TO RELATED APPLICATIONS

This application claims benefit of U.S. Provisional Application No. 61/515,200, filed Aug. 4, 2011, which is incorporated herein by reference.

BACKGROUND OF THE INVENTION

1. Field of the Invention

Embodiments of the present invention generally relate to catalytic gasification of coal.

2. Description of the Related Art

Gasification is the core of a coal-based integrated gasification combined cycle (IGCC) system, which has been considered a better way to use coal for electricity generation due to the adverse environmental impact of $CO_2$. Coal gasifiers are typically fed coal, steam, and oxygen or air. Volatiles are released from coal, leaving a solid char. Combustion of the volatiles and, to a lesser extent, the solid char, rapidly consumes the oxygen. The remaining char is then consumed by the relatively slow steam and $CO_2$ gasification reactions:

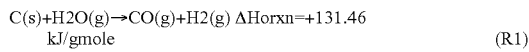

$$C(s)+H2O(g) \rightarrow CO(g)+H2(g) \; \Delta Horxn=+131.46 \; kJ/gmole \quad (R1)$$

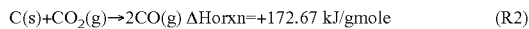

$$C(s)+CO_2(g) \rightarrow 2CO(g) \; \Delta Horxn=+172.67 \; kJ/gmole \quad (R2)$$

The rate of these two reactions, especially the faster steam gasification reaction (R1) determines the overall gasification rate, or, in other words, the rate that coal can be fed to a gasifier.

Both of the gasification reactions are endothermic. The heat of reaction is provided by the exothermic combustion reactions. The oxygen demand is determined largely by the heat required for these two reactions, plus the heat required to raise the feedstocks to the gasifier operating temperature. Char gasification can be catalyzed by alkaline metal salts. Kapteijin, et al., for example, showed the catalytic effect of 10 group I and group II metals on the carbon dioxide gasification of Norit, an acid-washed peat char. Lang and Neavel showed that a Wyoming sub-bituminous coal, when washed with acetic acid, had a much lower steam gasification rate than when the same coal was unwashed, thereby demonstrating the catalytic effect of naturally occurring alkaline metals.

The addition of a catalyst to coal could allow a lower gasification temperature. This would improve the thermodynamic efficiency of gasification and reduce oxygen demand. Alternatively, at a fixed temperature, a catalyst would allow a higher coal feed rate. Both approaches have the potential to improve the economics of gasification.

A key problem in the use of gasification catalysts is that the spent catalyst leaves the gasifier mixed with ash or slag. If the catalyst is water soluble, then the ash could be leached to recover the catalyst. This adds cost and complexity to the gasification process. Also, catalyst recovery would be less than complete. Catalyst recovery is not feasible if a slagging gasifier is used. Sharma, et al. avoided the ash/catalyst separation problem by gasifying an ash-free Hypercoal, produced by solvent extraction of coal.

Sodium is one of the few catalysts that is both effective and sufficiently inexpensive to be used on a once-through basis, thereby avoiding the need to recover the catalyst. Quyn, et al. showed that sodium chloride is an effective catalyst for the gasification of Loy Yang brown coal. Sodium chloride occurs naturally in this coal. For most gasifiers, however, this is an undesirable form of sodium, because of the corrosive nature of the chloride ion.

Accordingly, there is a need for catalytic gasification of coal using an inexpensive form of sodium produced in large volumes from naturally occurring trona ($Na_2CO_3 \cdot NaHCO_3$) ores.

SUMMARY OF THE INVENTION

The present invention generally relates to a catalytic gasification of coal. Catalytic gasification of a Wyodak low-sulfur sub-bituminous coal from the Powder River Basin of Wyoming was investigated using an inexpensive sodium carbonate catalyst applied via incipient wetness impregnation. Experiments in an atmospheric pressure fixed-bed laboratory gasifier were performed to evaluate the effects of reaction temperature, feed gas steam content, and $Na_2CO_3$ loading on the catalytic gasification of the Wyodak coal. The temperature range investigated (700-900 degrees Celsius) was selected with consideration of the $Na_2CO_3$ melting point (850 degrees Celsius) to reduce the loss by volatilization of sodium. Sodium was found to be active during both pyrolysis and gasification steps. The catalyst was most cost-effective at addition levels of approximately 3 wt %. The random pore model provided a good fit to the conversion versus time data collected under both the catalytic and the uncatalytic conditions.

According to a first embodiment, there is provided A coal gasification method, comprising mixing a coal derived solid with a sodium carbonate catalyst to form a reaction mixture, heating the reaction mixture to a target temperature between about 700° C. and about 900° C., maintaining the reaction mixture at a pressure below about 1 atm., contacting the reaction mixture with water vapor, and forming carbon monoxide from the reaction mixture.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
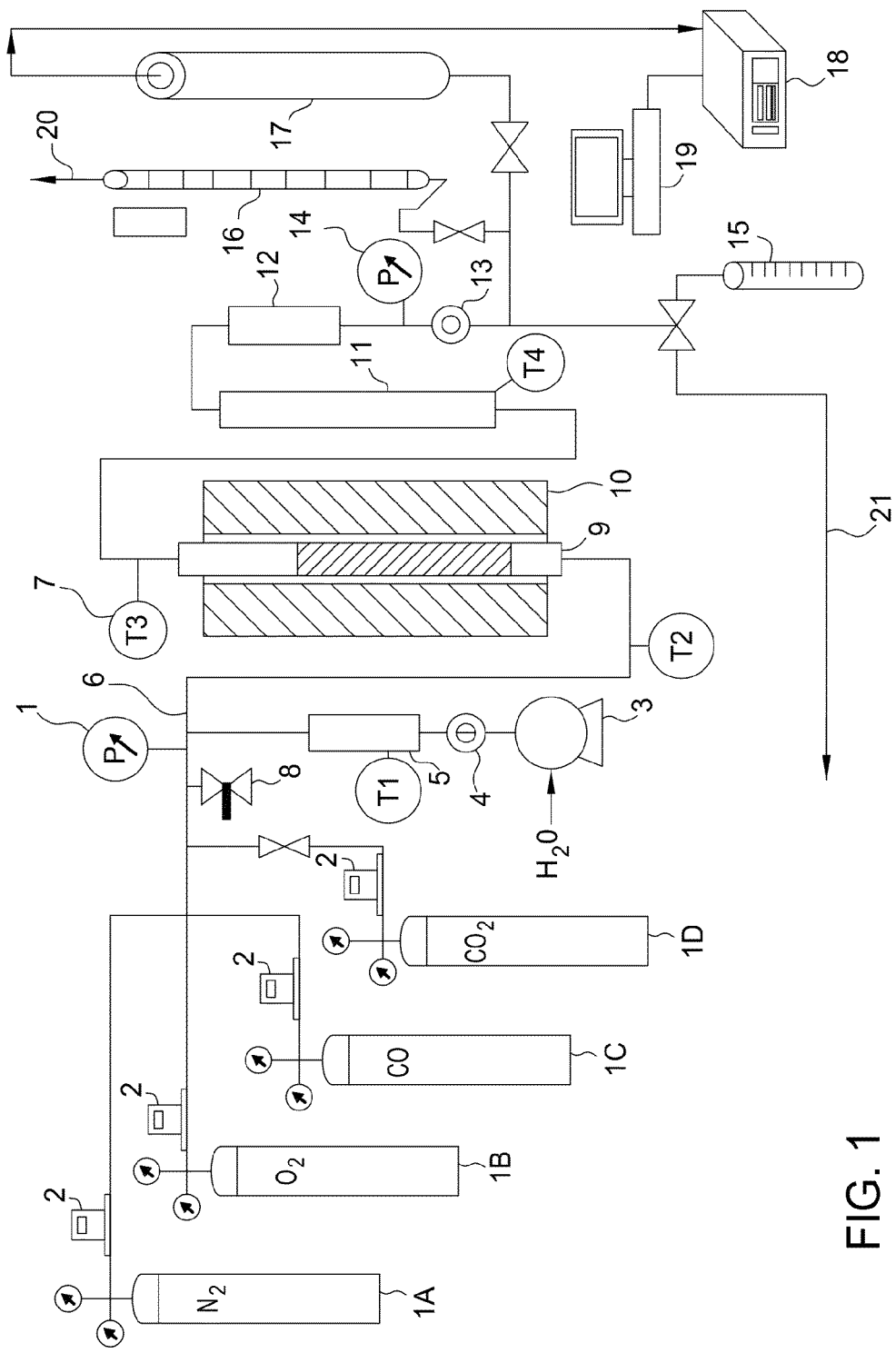
FIG. 1 is a schematic diagram of a catalytic coal gasification system.

The present invention generally relates to a catalytic gasification of coal. Catalytic gasification of a Wyodak low-sulfur sub-bituminous coal from the Powder River Basin of Wyoming was investigated using an inexpensive sodium carbonate catalyst applied via incipient wetness impregnation. Experiments in an atmospheric pressure fixed-bed laboratory gasifier were performed to evaluate the effects of reaction temperature, feed gas steam content, and $Na_2CO_3$ loading on the catalytic gasification of the Wyodak coal. The temperature range investigated (700-900 degrees Celsius) was selected with consideration of the $Na_2CO_3$ melting point (850 degrees Celsius) to reduce the loss by volatilization of sodium. Sodium was found to be active during both pyrolysis and gasification steps. The catalyst was most cost-effective at addition levels of approximately 3 wt %. The random pore model provided a good fit to the conversion versus time data collected under both the catalytic and the uncatalytic conditions.

Experimental Section
Preparation of Catalyzed Coal Samples

Aqueous solutions of $Na_2CO_3$ (dense soda ash, 99.8%, FMC) were mixed with a raw Wyoming Powder River coal [Wyodak, 80% passed 200 mesh (74 μm openings)] using an incipient wetness impregnation method known in the art. The nominal loading of sodium on the coal was from about 1 to about 5 wt %, such as from about 2 to about 4 wt %, for example about 3 wt %, on a dry and ash free (DAF) basis. A reference sample was prepared using distilled water instead of the catalyst solution. The resulting materials were air-dried at 98 degrees Celsius (371 Kelvin) to constant mass and then kept in an air-tight receptacle to prevent further change in moisture content or loss of volatile matter. For faster drying, the wet coal may be exposed to air, or a dry gas such as nitrogen gas, at a higher temperature such as 150° C. Alternately, coal may be prepared for gasification by mixing powdered $Na_2CO_3$ with a powdered raw coal.

Sample Characterization

Analyses conducted to characterize the raw and catalyzed coal samples included determinations of moisture, volatile matter, fixed carbon, ash, elemental analysis, surface area, and mass loss during thermogravimetry. Specific surface area was measured via nitrogen physisorption using the BET method with a Micromeritics TriStar 3000 V6.04 A. Proximate analysis was performed according to ASTM methods D5142 and D5016, ultimate analysis according to ASTM D5373, D5016, D4239, and ash analysis according to ASTM D-6349.

Thermogravimetric analysis (TGA) was performed on a TA Instruments SDT Q600 apparatus. The coal sample (~50 mg) was loaded on a ceramic capped (alumina) sample holder. After 10 minutes of isothermal equilibration, the sample was heated at 20 degrees Celsius/min in flowing Ar (Ultra High Purity (UHP), US Welding) at 100 ml/min to a maximum pyrolysis temperature of 1,200 degrees Celsius and held at this temperature for another 10 minutes for isothermal equilibration. The reacted sample was then cooled to 35 degrees Celsius using forced convection in air.

Gasification Tests

FIG. 1 shows the gasification apparatus used in this study. FIG. 1 shows a schematic diagram of catalytic coal gasification with the following reference numerals: (1A) $N_2$, (1B) $O_2$, (1C) CO, (1D) $CO_2$ ; (2) mass flow controller; (3) high pressure pump; (4) back pressure regulator; (5) boiler; (6) heat traced stainless steel tubing; (7) thermocouples; (8) pressure relief valve; (9) stainless steel reactor; (10) furnace; (11) coal tar condenser; (12) water-cooled condenser; (13) back pressure regulator; (14) pressure gauges; (15) condensed water; (16) product gases; (17) water trap; (18) gas chromatograph (GC); and (19) data acquisition system. The gasifier body is a stainless steel tube in a tube furnace. All tests were conducted at a pressure slightly above the ambient atmospheric pressure in our laboratory. Note that due to the elevation of our laboratory (2,200 m), the ambient atmospheric pressure is about 75 kPa. Catalyst-loaded coal samples were gasified in $H_2O$— $N_2$ mixtures.

A quantity of coal sample corresponding to approximately five grams of dry and ash free (DAF) coal were used for each gasification test. The coal sample was heated in $N_2$ at 20 degrees Celsius/min to the desired gasification temperature and then water vapor was introduced. The coal gasification kinetic experiments used the following inlet gases (1): $N_2$ (UHP, US Welding), $O_2$ (UHP, Air Liquide), CO (UHP, US Welding), and $CO_2$ (UHP, Praxair). These gases may be omitted in a process for gasifying coal according to the methods described herein.

The flow rate of each gas into the process was controlled via a mass flow controller (2) (Porter Instruments series 201) with a 4 channel PCIM4 controller. Water was supplied by a high pressure pump (3) (Scientific Systems-Lab Alliance Series 1) with a back pressure regulator (4) (GO Regulator) and vaporized in a coil type vaporizer (5) wrapped with heating tape, although any source of steam or water vapor may be used.

The stainless steel tubing before and after the reactor was heat traced (6), with their temperatures monitored by thermocouples (7) as indicated, to preheat the gas/water vapor mixture and to prevent coal tar and water condensation in the reactor outlet. Alternately, the tubing, or piping, before and after the reactor may be insulated.

The reactor assembly consisted of a ½ inch (13 mm) diameter tubular stainless steel reactor (9), with ceramic wool supporting the coal sample. Outside the reactor, ceramic wool was also used for additional insulation, although any suitable material known in the art may be used for insulation and/or support.

The reactor was temperature controlled in a tube furnace (10, Thermolyne 21100), although any suitable heat source may be used, including piping inside the reactor that contains a hot material such as hot oil or steam. In another alternate embodiment, an inert gas may be heated outside the reactor and flowed into the reactor to deliver heat.

The coal tar condenser (11) was heated slightly to prevent steam condensation, while still allowing coal tar separation from the outlet gas. Following the coal tar condenser, water vapor was condensed in a water-cooled condenser (12). For experimental purposes, provisions were included to measure the flow rate of the condensed water (15) prior to safe disposal.

The system pressure was regulated by another back pressure regulator (13, GO Regulator) and monitored using a pressure gauge (14). The reactor was protected against over-pressure using a pressure relief valve (8). The flow rate of the remaining product gases was measured (16) before venting to the fume hood. Alternately, the product gases may be collected, stored, subsequently processed or purified, and/or shipped via container or pipeline. For experimental purposes, a slipstream was diverted through a desiccant-filled water trap (17) to a gas chromatograph (Agilent 3000A micro GC) equipped with two micro-columns (8 m MolSieve 5A PLOT and 4 m PoraPlot U) to separate $H_2$, CO, $N_2$, $CO_2$, and light hydrocarbons, such as $CH_4$, prior to concentration analysis using a calibrated thermal conductivity detector (TCD). All data were recorded on a data acquisition system (19).

Residence time of the catalyzed coal at reaction conditions may be up to 5,000 minutes and is usually at least about 100 minutes, such as between about 100 minutes and about 3,000 minutes, for example between about 100 minutes and about 2,000 minutes. At higher temperatures, lower residence times may be used. For example in one embodiment, a residence time between about 50 minutes and about 100 minutes, for example about 80 minutes may be used.

Results and Discussion
Characteristics of Raw Coal

Proximate and ultimate analyses and heating value for the selected Wyodak coal are shown in Table 1.

Hydrogen and oxygen values reported in Table 1 do not include hydrogen and oxygen in the free moisture associated with the sample. The moisture content of the coal, as received, is nearly 21 wt %, which limits the measured heating value to 21,527 kJ/kg (9,255 BTU/lb) compared to 27,205 kJ/kg (11,696 BTU/lb) for the dry coal. The volatile matter fraction accounts for approximately 34 wt %. This portion generates flammable gases during pyrolysis and gives a more reactive character for the coal in entrained flow and fluidized bed gasification reactors. For other, lower-temperature gasification approaches, this volatile matter content would require a coal tar treatment unit operation. This is evident in the small-scale fixed-bed reactor facility used in this study, which included a dedicated coal tar separator. The ultimate analysis of this sub-bituminous coal shows the expected low sulfur content of 0.42 wt %. The relatively high oxygen content, calculated by difference at approximately 16 wt %, is advantageous for increasing this coal's reactivity during pyrolysis and for generating active sites during gasification.

Analysis of the Pyrolyzed Coal-Ultimate Analysis and Ash

A fixed-bed reactor (FIG. 1) was used to evaluate the gasification performance of the catalyzed coal samples, although, as noted above, entrained flow and fluidized bed reactors may be used to perform the processes described herein. In most tests, temperature was increased in $N_2$ to the desired value before steam was introduced. Since the gasification experimental temperatures were below 950 degrees Celsius, which is typically used for proximate analyses, the quantity and composition of the char from the pyrolysis step were measured in order to close the material balances. This analysis also provided insight on the variations in composition of the gasification products. Thermogravimetric analysis (TGA) was used to quantify the solid mass that could be expected after the pyrolysis step. Separately, catalyzed coal samples, containing 0, 2, and 5 wt % Na, were devolatilized and ultimate (elemental) analyses used to provide estimates for the compositions of the resulting char. The devolatilization temperatures were 700, 800, and 900 degrees Celsius, corresponding to the comparative gasification tests. Finally, an ash sample was generated from the non-treated coal, via low-temperature (900 degrees Celsius) combustion, and analyzed to identify components with potential to catalyze additional reactions. Nonlinear interpolation was used to obtain data in the case of non-tested pairs of initial composition and test temperature.

The results of the elemental (ultimate) analysis of the devolatilized samples are given in Table 2.

TABLE 1

|  | As Received (wt %) | Moisture Free (wt %) | DAF (wt %) |
|---|---|---|---|
| Proximate Analysis |  |  |  |
| Moisture | 20.87 | — | — |
| Ash | 5.86 | 7.41 | — |
| Volatile matter | 34.29 | 43.33 | 46.80 |
| Fixed carbon | 38.98 | 49.26 | 53.20 |
| Total | 100.00 | 100.00 | 100.00 |
| Ultimate Analysis |  |  |  |
| Moisture | 20.87 | — | — |
| Hydrogen | 2.46 | 3.11 | 3.36 |
| Carbon | 53.67 | 67.83 | 73.26 |
| Nitrogen | 0.89 | 1.12 | 1.21 |
| Sulfur | 0.42 | 0.53 | 0.57 |
| Oxygen | 15.83 | 20.00 | 21.60 |
| Ash | 5.86 | 7.41 | — |
| Total | 100.00 | 100.00 | 100.00 |
| Heating Value, (Btu/lb) | 9,255 | 11,696 | 12,632 |
| (kJ/kg) | 21,527 | 27,205 | 29,382 |

TABLE 2

| | Na dosage | | | | | | | | |
|---|---|---|---|---|---|---|---|---|---|
| | 0 wt % | | | 2 wt % | | | 5 wt % | | |
| | Pyrolysis Temperature(° C.) | | | | | | | | |
| | 700 | 800 | 900 | 700 | 800 | 900 | 700 | 800 | 900 |
| Ash (wt %) | 10.3 | 11.01 | 11.61 | 13.54 | 14.05 | 14.68 | 19.37 | 20.97 | 21.25 |
| C (wt %) | 81.53 | 82.87 | 83.85 | 79.76 | 79.90 | 80.24 | 73.30 | 73.81 | 74.78 |
| H (wt %) | 1.69 | 0.98 | 0.59 | 1.3 | 0.76 | 0.47 | 1.07 | 0.58 | 0.33 |
| N (wt %) | 1.51 | 1.46 | 1.40 | 1.48 | 1.59 | 1.54 | 1.43 | 1.58 | 1.52 |
| S (wt %) | 0.36 | 0.32 | 0.37 | 0.27 | 0.3 | 0.33 | 0.25 | 0.33 | 0.36 |
| O (wt %) | 4.61 | 3.36 | 2.18 | 3.65 | 3.4 | 2.74 | 4.15 | 2.73 | 2.06 |

Hydrogen, nitrogen, and oxygen are all lost from the structure in the form of volatile material and water as the temperature is increased. Consequently, the carbon contents increase from 54 wt % to over 74 wt % in all devolatilized samples. Ash concentration also increases with pyrolsis temperatures.

Ash analysis is given in Table 3.

TABLE 3

| Element | (wt %) | Oxide | (wt %) |
|---|---|---|---|
| Si | 14.24 | $SiO_2$ | 31.77 |
| Al | 7.59 | $Al_2O_3$ | 14.97 |
| Fe | 4.23 | $Fe_2O_3$ | 6.31 |
| Mg | 3.83 | MgO | 6.62 |
| Ca | 18.73 | CaO | 27.33 |
| Ti | 0.6 | $TiO_2$ | 1.04 |
| K | 0.66 | $K_2O$ | 0.83 |
| P | 0.51 | $P_2O_5$ | 1.22 |
| Na | 1.26 | $Na_2O$ | 1.77 |
| Mn | 0.02 | $MnO_2$ | 0.04 |
| Ba | 0.35 | BaO | 0.41 |
| Sr | 0.41 | SrO | 0.51 |
| S | 2.76 | $SO_3$ | 7.19 |

The ash contains over 6 wt % iron oxide, which is known to catalyze the water-gas-shift reaction, as evidenced by increasing hydrogen concentration toward the end of gasification tests reported in the literature. It has been proposed that at temperatures around melting point of $Na_2CO_3$ (850 degrees Celsius), sodium forms through the following reaction:

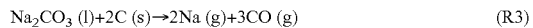

$$Na_2CO_3 \text{ (l)} + 2C \text{ (s)} \rightarrow 2Na \text{ (g)} + 3CO \text{ (g)} \qquad (R3)$$

which implies a possible loss of Na at temperatures above 850 degrees Celsius. However, this physical loss is expected to occur at a slow rate (less than 5 wt % Na at 10 K/min heating rates) for temperatures below 1000 degrees Celsius. During coal devolatilization at high temperatures, sodium is also thought to be lost as Na-volatile compounds because studies have shown minimal presence of sodium in solid gasification by-products, while calcium and magnesium were found in gasification by products of processes using calcium and magnesium carbonates. $Na_2CO_3$-catalyzed gasification of coal at temperatures below the Na carbonate melting point (850 degrees Celsius), for example between about 700° C. and about 900° C., therefore avoids the potential volatilization of sodium. The processes described herein are useful for sodium carbonate gasification of a Powder River Basin coal in a fixed bed reactor at temperatures of 700-900 degrees Celsius.

TGA-DSC Data Interpretation

Figure 2:
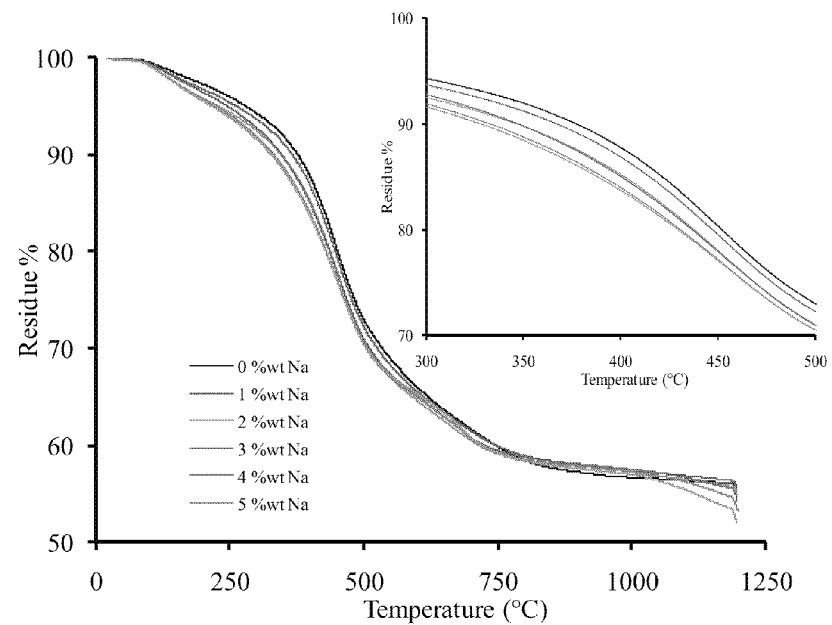
FIG. 2 is a graph showing a thermogravimetric analysis (TGA) for 0-5 wt % Na treated coals.

FIG. 2 shows the results of the TGA analysis, presented as a percentage of the initial mass of five catalyzed coal samples and the reference coal sample remaining in the ceramic holder as the temperature of the furnace was increased to 1,200 degrees Celsius. The values for the intermediate temperatures ranging from 400 to 1,100 degrees Celsius are summarized in Table 4.

TABLE 4

| | Temp. (° C.) | | | | | | | |
|---|---|---|---|---|---|---|---|---|
| | 400 | 500 | 600 | 700 | 800 | 900 | 1,000 | 1,100 |
| Na (wt %) | Residual mass (% of initial sample) | | | | | | | |
| 0 | 87.64 | 73.03 | 66.03 | 61.68 | 58.49 | 57.20 | 56.66 | 56.39 |
| 1 | 86.89 | 72.21 | 65.49 | 61.41 | 58.90 | 57.95 | 57.34 | 56.86 |
| 2 | 85.19 | 70.92 | 64.51 | 60.46 | 58.36 | 57.54 | 57.00 | 56.45 |
| 3 | 85.00 | 70.98 | 65.11 | 60.76 | 58.80 | 58.04 | 57.50 | 56.63 |
| 4 | 83.97 | 70.51 | 65.02 | 60.63 | 58.52 | 57.87 | 57.22 | 56.25 |
| 5 | 83.71 | 70.53 | 65.31 | 60.78 | 58.43 | 57.63 | 56.94 | 55.41 |

The results show enhanced volatility between 100 and 800 degrees Celsius with increasing Na content. The difference in the measured volatilization was up to 5 wt % of the initial mass for the sample containing 5 wt % Na compared with the untreated coal sample. As discussed previously, some Na loss due to volatilization of Na-containing compounds may be expected in this temperature range, but the observed effect is thought to be due to reactions of $Na^+$ with —OH and —COOH groups present in coal, by forming alkali-oxygen surface groups, which provide extra oxygen on the coal surface and make the carbon in the coal more reactive to produce $CO_2$, $H_2$, $CH_4$, and coal matrix fragments, as has been reported in the art.

Coal tar was separated using a condenser (FIG. 1). Therefore, only the following light species were identified by gas chromatography: $H_2$, CO, $CO_2$, $CH_4$, and ethane/ethylene. Amounts of these species reached a maximum in samples taken when the reactor was around 500 degrees Celsius and decreased at higher temperatures.

Figure 3:
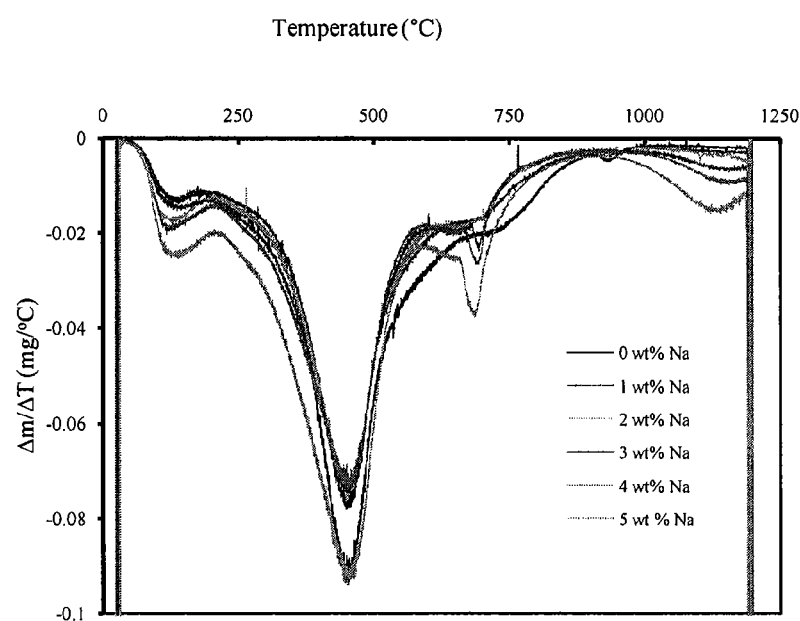
FIG. 3 is a graph showing change of weight loss of 0-5 wt % NA treated coals obtained with TGA with temperature.

Analysis of the derivative of mass loss with respect to temperature in FIG. 3 [TGA operation conditions: heating rate-20 degrees Celsius/min; carrier gas: Ar; carrier gas flow rate: 100 ml/min; maximum temperature of the pyrolysis-1200 degrees Celsius] reveals that the absolute maximum in the rate of change of mass loss occurs around 450 degrees Celsius for all samples, while samples containing 3, 4, and 5 wt % Na display another local maximum peak at 692, 690, and 684 degrees Celsius, respectively. The rate of change of mass loss increases with $Na_2CO_3$ addition. The samples containing 0, 1, and 2 wt % Na have a secondary maximum at much higher temperatures, around 930 degrees Celsius. All of the samples display a final increase in the rate of mass loss around 1,130 degrees Celsius. The size of this peak decreases and occurs at higher temperatures as the initial sodium content of the samples decreases. None of the samples shows a peak that might be associated with the melting and vaporization of sodium, which would be expected around 850 degrees Celsius. However, the untreated sample does have a small peak at 925 degrees Celsius, but none at the higher temperature around 1,130 degrees Celsius. Thus, the high temperature peak appears to be associated with the added sodium content of the coals, perhaps associated with delayed mass loss of sodium due to pore diffusion effects.

Figure 4:
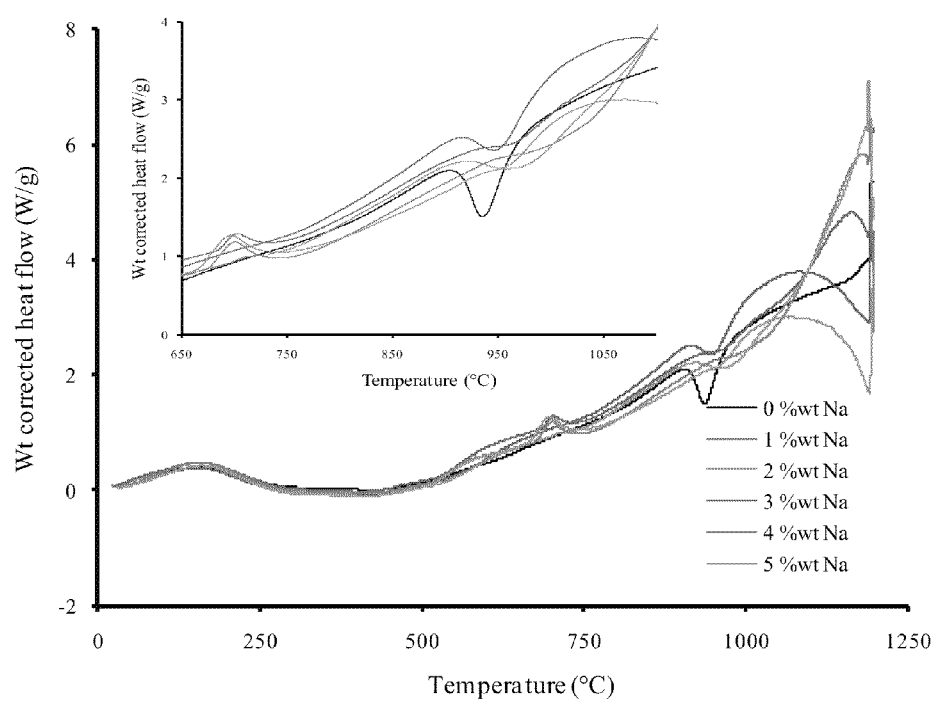
FIG. 4 is a graph showing differential scanning calorimetry (DSC) weight corrected heat flows of 0-5 wt % Na treated coals.

All mass losses described have associated peaks in the corresponding Differential Scanning calorimetry (DSC) results, shown in FIG. 4, which displays the energy flows associated with the mass loss [TGA operation conditions: heating rate-20 degrees Celsius/min; carrier gas: Ar; carrier gas flow rate: 100 ml/min; maximum temperature of the pyrolysis-1200 degrees Celsius]. In this figure, endothermic processes are positive, while exothermic processes are negative. Overall, pyrolysis is an endothermic process, marked with descendant peaks. The weight-corrected heat flow plots (FIG. 4) show that $Na_2CO_3$ addition influences not only the organic matter, but also the inorganic material in the coal ash. For example, the exothermic peak around 950 degrees Celsius is assigned to interaction with inorganic matter because little associated volatilization/mass loss is visible at the corresponding temperature in the TGA results (FIGS. 2 and 3). This peak is shifted toward higher temperatures and broadened as Na content increases. These temperatures are below the melting range of the ash; thus, no endothermic peaks associated with ash melting are observed.

Performance of the Catalyst During Gasification

Variable Water Flow Rate

Figure 5:
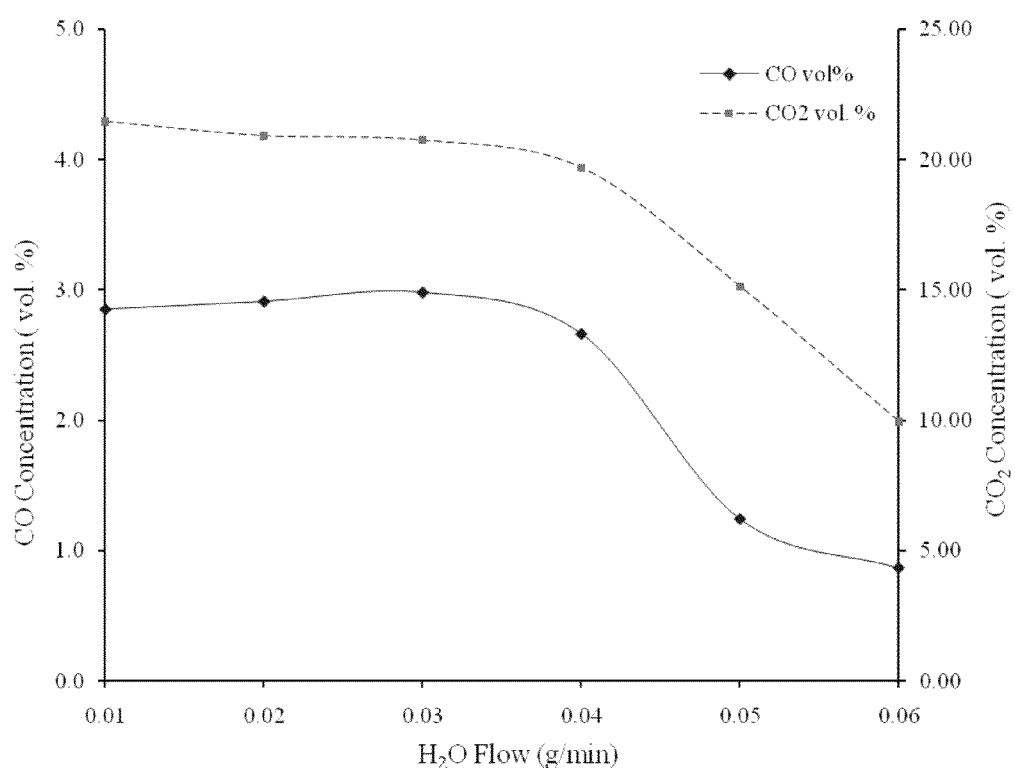
FIG. 5 is a graph showing the effect of water addition rate on CO production at 1,100 degrees Celsius.

Results from this test indicated that, at a constant temperature (between 700 and 1,100 degrees Celsius), gasification product concentrations increase, reach maximum values, and then decrease, as the flow rate of feed steam increases, possibly due to initial saturation of the coal surface with reactive intermediates, followed by inhibition by the excess water. As depicted in FIG. 5, which shows the product concentrations of CO and CO$_2$ as a function of inlet steam flow rate during gasification at 1,100 degrees Celsius, the slope of both curves before the maximum is nearly zero, which indicates that initial steam concentration does not affect gasification rates and is thus not the rate-determining component for the overall gasification reaction. This test established that for the experiments with an initial charge of 5 g of coal (on a moisture- and ash-free basis), a water flow rate of 0.04 g/min provides a slight water excess, for example a stoichiometric excess not exceeding about 200%, without compromising the reaction rate. These test conditions were used for the next set of gasification tests.

Constant Water Flow Rate

In these experiments, a constant quantity of coal (5 g DAF) was used. A flow of N$_2$ was initially introduced to the reactor to remove all O$_2$. The temperature was then increased to the final test temperature and maintained at this constant value as steam was introduced. Functionally, the test can be divided into two phases: pyrolysis in flowing N$_2$ as the temperature increases at 20 degrees Celsius/min to the desired value and gasification in flowing H$_2$O and N$_2$ at constant temperature.

As discussed previously, a TGA-DSC test was performed at the same heating rate of 20 degrees Celsius/minute to evaluate the mass loss during pyrolysis at various temperatures, also, pyrolyzed samples were chemically analyzed, thus, the mass and the composition of the samples at the end of the pyrolysis step were known and were used to close the mass balance for the gasification step (See Tables 2 and 4). The mass loss curves as function of temperature (FIG. 2) show that an increased addition of Na$_2$CO$_3$ is reflected in an increase in the mass loss of the samples for the same temperature. After water vapor was introduced, GC analysis showed the concentrations of C$_2$ and higher hydrocarbons decreased below the detection limit in a matter of minutes, while CH$_4$ remained at low levels (generally below 2 mol %), with a concentration decay rate inversely proportional to the initial Na concentration in the samples.

Figure 6:
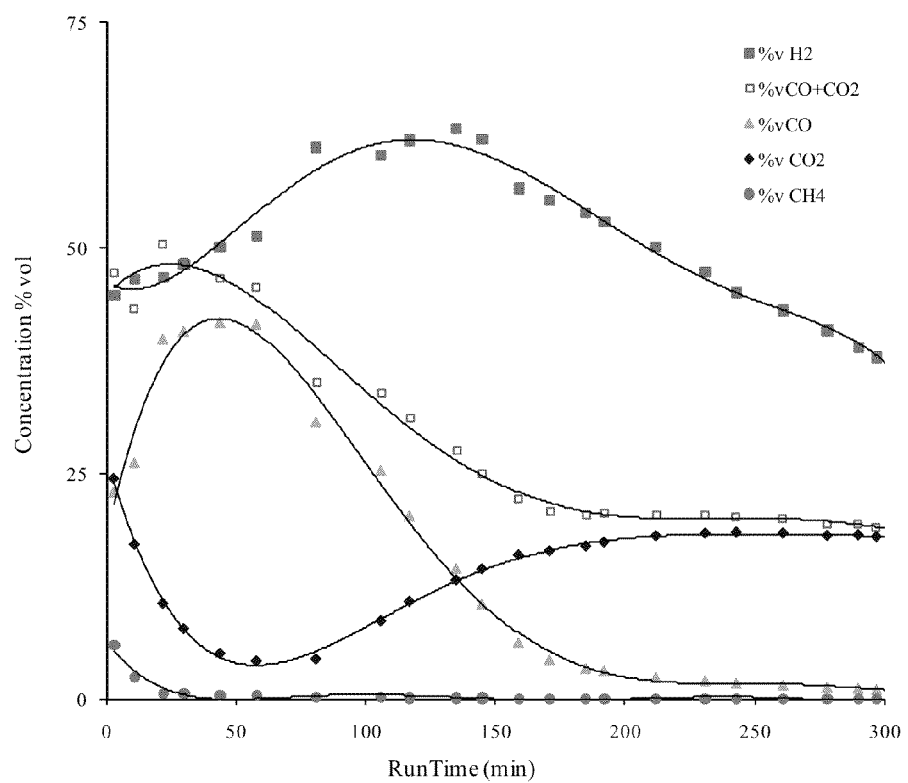
FIG. 6 is a graph showing product concentrations (H2, CO, CO2, and CH4) as a function of gasification time.

As shown in FIG. 6, CO$_2$ concentration in the gasification products is initially high, about 25 mol %, likely as a result of pyrolysis reactions and other chemical interactions involving oxygen in the coal (See Tables 1 and 2). It then shows a marked decrease with time before increasing and reaching a stable concentration of about 20 mol %. This gradual increase is likely due to the water gas shift reaction operating in parallel to the primary gasification reactions in the slight excess of water [H$_2$O: 0.04 g/min; T:800 degrees Celsius, Na: 5wt %], especially as more ash becomes available because it is apparently catalyzed by the iron oxide component in the ash of the spent material [12, 13, 14]. Carbon consumption is shown at the CO+CO$_2$ curve. At short reaction times, the bulk of the gasified carbon appears as CO, but at longer reaction times, most of the CO is converted to CO$_2$ by the water gas shift reaction:

CO(g)+H$_2$O(g)↔CO$_2$(g)+H$_2$(g) ΔH°$_{rxn}$=−41.21 kJ/gmole     (R4)

The water gas shift reaction may also occur in the gas phase, without a catalyst, especially at high gasification temperatures. Hydrogen is generated by both the steam gasification reaction (R1) and the water gas shift reaction (R4). The hydrogen rate rises, reaches a maximum, and then declines.

As shown in FIG. 6, concentration of CO in the product gas produced from the reaction mixture of coal and catalyst is at least about 20% by volume within the first 100 minutes of gasification. In the exemplary process represented by FIG. 6, the concentration of CO in the product gas reaches over 40% by volume at around 50 minutes. By contrast, concentration of methane in the product gas declines toward zero as the reaction proceeds, reaching a level of less than about 0.5% by volume after 50 minutes of gasification.

Models for Char Gasification

Two models were considered in this research to fit the kinetic data collected in this research. Coal is a porous material. Therefore, the pore surface area greatly exceeds the external particle surface area. Reaction inside the pores could be inhibited by mass transfer, however, so the reaction could occur primarily on the exterior particle surface. If this is the case, then the reaction can be modeled with the shrinking core model, or the first model as given below:

$$\frac{dX}{dt} = k_{SC}(1-X)^{2/3} \quad (E1)$$

where: X=fractional conversion,
t=time, and
k$_{SC}$=reaction rate constant for the shrinking core model.

In the absence of diffusion limitations, it would be more reasonable to expect that the reaction rate is primarily determined by the pore surface area. This is the basis of the random pore model [22], the second model used in this research, as shown in E2:

$$\frac{dX}{dt} = k_{RP}(1-X)\sqrt{1-\psi\ln(1-X)} \quad (E2)$$

where: k$_{RP}$=reaction rate constant for the random pore model and
ψ=a shape factor based on pore length, void fraction, and pore surface area.

The shape factor, ψ, has physical meaning, but one of the properties used to calculate this value, the length of pores per unit volume of coal, cannot be readily measured. Consequently, ψ is used as an adjustable fitting parameter.

The shrinking core model predicts that the gasification rate declines with conversion. This is because as the particles become smaller the particle exterior surface area also becomes smaller. The random pore model, on the other hand, predicts that the gasification rate initially increases and then declines. As the particle gasifies, the diameter of the pores increase. Initially, this produces a larger pore surface area. Later, the walls between pores are consumed, so the pore surface area and the reaction rate decline. Note that the shrinking core model predicts a constant particle density and a shrinking particle size. The random pore model, on the other hand, predicts a constant particle size and a shrinking particle density.

Comparison of the Two Kinetic Models

Figure 7:
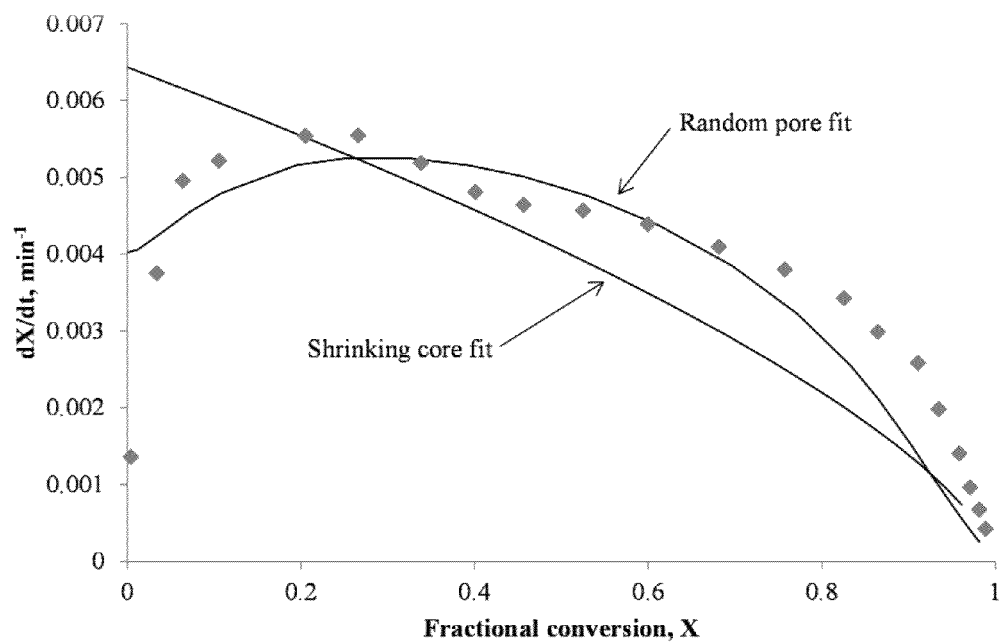
FIG. 7 is a graph showing a comparison of two kinetic models in fitting dX/dt~X data collected during gasification of 2 wt % Na loading coal at 700 degrees Celsius.

FIG. 7 shows a plot of reaction rate versus fractional conversion for a gasification experiment at 700 degrees Celsius and at a 2 wt % sodium loading. While neither model is a close fit to the reaction rate behavior, the random pore model does a better job of explaining the observed trends.

Similar plots for other experiments in this study showed that peak reaction rates typically occurred between 20 and 40% conversion. The peak reaction rate predicted by the random pore model is a function of ψ, the shape factor. For all of the experiments in this study, the value of ψ was fixed at 7, which corresponds to a peak reaction rate at 30% conversion. This value gave an excellent fit to the data for most of our experiments. One may argue, based on the char yields shown in Table 4, which is shown in the Appendix, that the value of ψ should change according to the conditions used to produce the initial char. Our data is not sufficiently precise to explore this effect.

Figure 8:
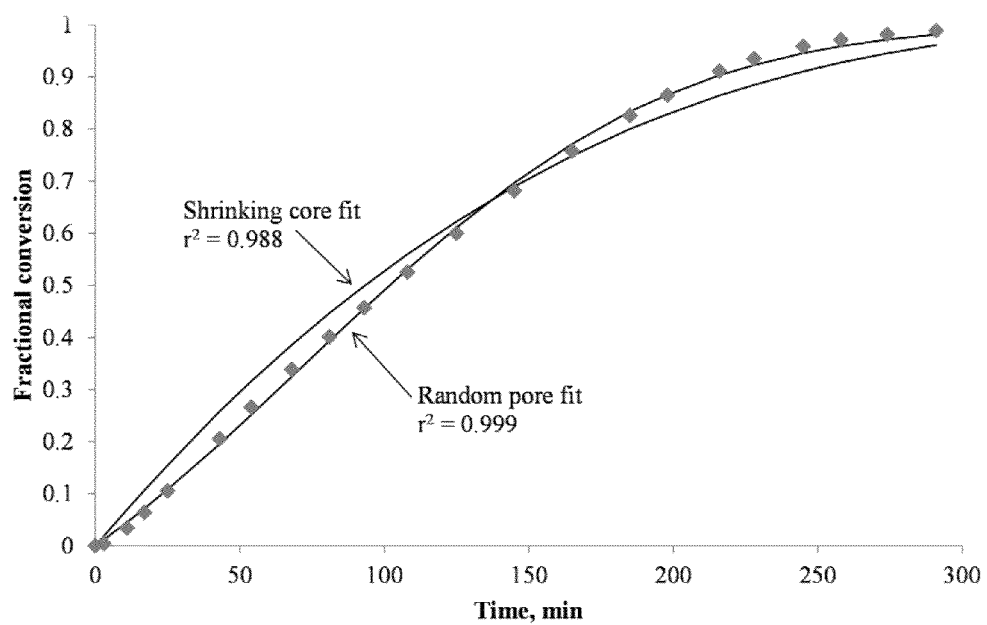
FIG. 8 is a graph showing a comparison of two kinetic models in fitting X~t data collected during gasification of 2 wt % Na loading coal at 700 degrees Celsius.

FIG. 8 is a plot of fractional conversion versus time for the same experiment shown in FIG. 7. While the shrinking core model does a good job of correlating the data, it slightly over predicts conversion at short reaction times and slightly under predicts conversion at long reaction times. The random pore model, on the other hand, provides a nearly perfect fit to the data.

Random Pore Fit

With the shape factor, ψ, fixed at 7, the reaction rate constant, kRP, was adjusted to minimize the sum of squared errors. Table 5 shows the results of the data fit. Table 6 shows the corresponding correlation coefficients, $r^2$. For most experiments, the data fit was excellent. A notable exception was the 900 degrees Celsius uncatalyzed experiment, which gave an unexpected result.

TABLE 5

| | Temp. (° C.) | | | | |
| --- | --- | --- | --- | --- | --- |
| Na (wt. %) | 700 | 750 | 800 | 850 | 900 |
| | Kinetic rate constant, $k_{RP}$ [*$10^3$ (min$^{-1}$)] | | | | |
| 0 | 1.164 | 3.675 | 4.433 | 7.000 | 4.27 |
| 1 | 3.290 | | 7.152 | | |
| 2 | 4.019 | | 6.489 | | |
| 3 | 4.277 | | 9.988 | | |
| 4 | 4.269 | | 10.08 | | |
| 5 | 4.021 | 4.727 | 6.952 | 9.008 | 14.826 |

TABLE 6

| | Temp. (° C.) | | | | |
| --- | --- | --- | --- | --- | --- |
| Na (wt. %) | 700 | 750 | 800 | 850 | 900 |
| | Correlation coefficient, $r^2$ | | | | |
| 0 | 0.944 | 0.986 | 0.999 | 0.995 | 0.847 |
| 1 | 0.995 | | 0.990 | | |
| 2 | 0.999 | | 0.997 | | |
| 3 | 0.997 | | 0.998 | | |
| 4 | 0.999 | | 0.942 | | |
| 5 | 0.996 | 0.998 | 0.992 | 0.995 | 0.952 |

Coal is a complex and variable material. Without added catalysts, gasification may occur at several types of sites. Some of these sites may be catalyzed by the several naturally occurring alkaline metals, while others may be uncatalyzed. Given this level of complexity, it is remarkable that a model as simple as the random pore model does such an excellent job of correlating the results.

Effect of Added Sodium Catalyst

Figure 9:
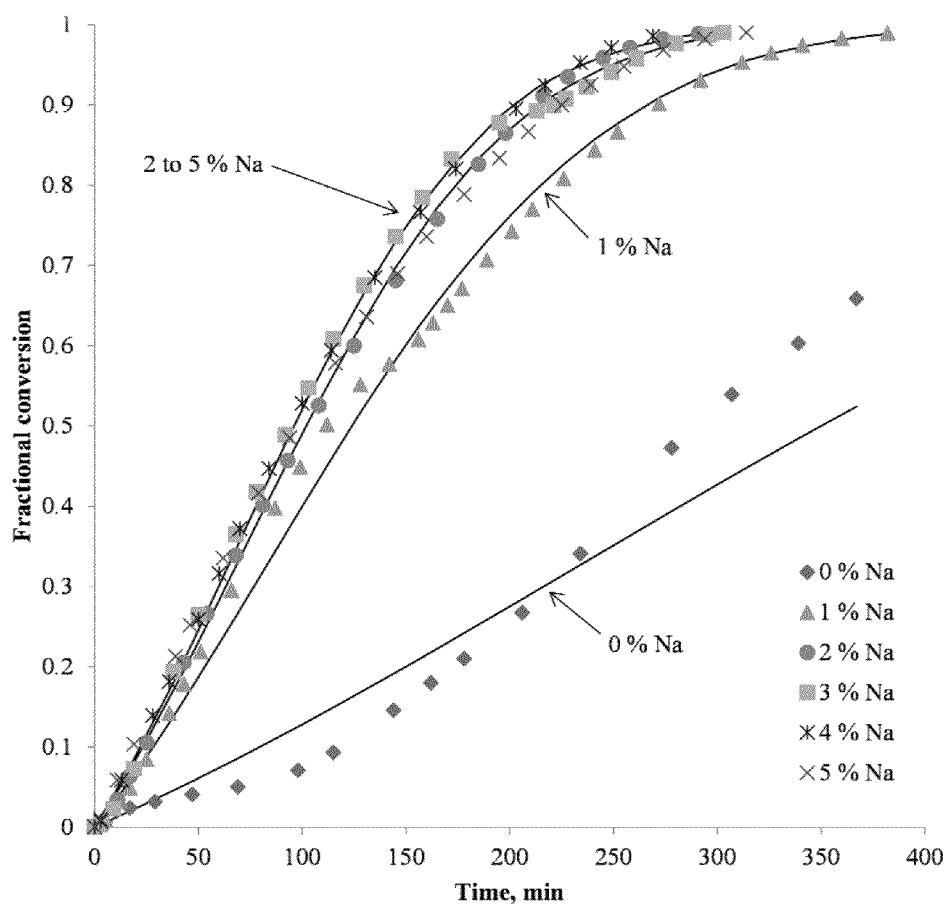
FIG. 9 is a graph showing random pore models fits for X~t data collected during gasification of various NA loading coals at 700 degrees Celsius.
Figure 10:
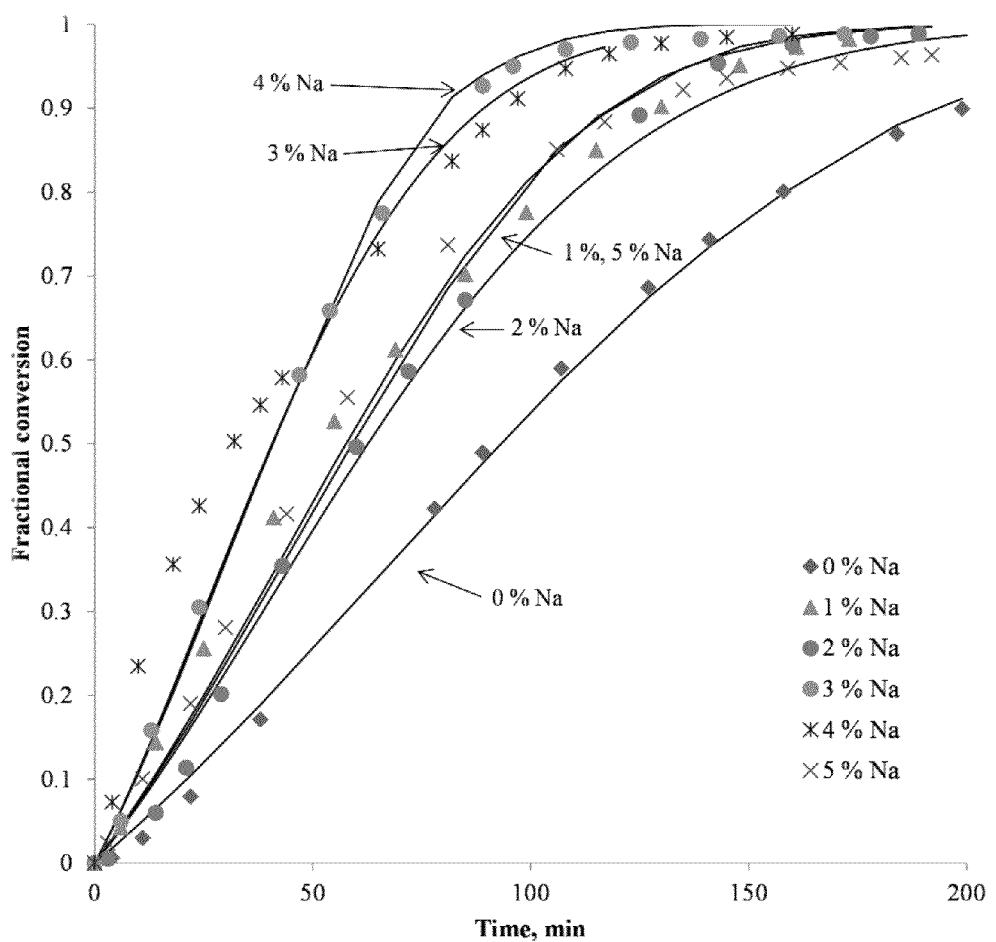
FIG. 10 is a graph showing random pore model fits for X~t data collected during gasification of various Na loading coals at 800 degrees Celsius.

FIG. 9 shows the effect of added sodium catalyst on gasification at 700 degrees Celsius. Addition of 1 wt % sodium results in a large increase in the reaction rate, while addition of 2 wt % sodium results in a smaller increase above the 1 wt % results. The results for 2, 3, 4 and 5 wt % added sodium are nearly overlapping. FIG. 10 shows the effect of added sodium catalyst at 800 degrees Celsius. All of the catalyzed experiments show a faster reaction rate than the uncatalyzed experiment. The reaction rate at 800 degrees Celsius generally increases with increasing sodium addition, but the 5 wt % Na sample displayed a rate similar to the 1 and 2 wt % samples, which suggests that there is may be an optimal amount of catalyst addition near 3 or 4 wt % that produces the highest rates. This optimum is clearer in the following figure.

Figure 11:
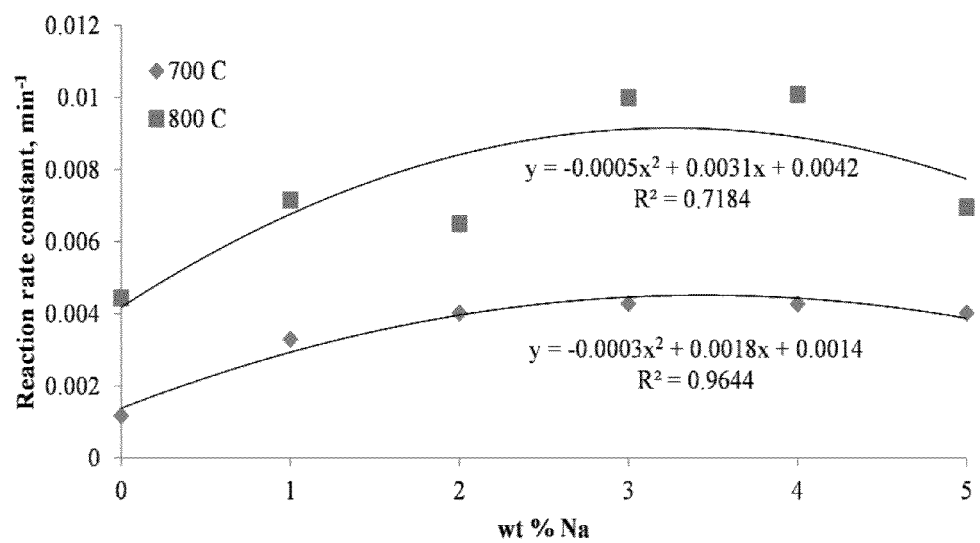
FIG. 11 is a graph showing the effect of the quantity of the sodium catalyst on gasification reaction rate constant (kRP) and the corresponding random pore model fits.

FIG. 11 is a plot of the kinetic constants, $k_{RP}$, versus added sodium content. The 700 degrees Celsius results show a consistent trend. The catalytic sites on the coal surface appear to be saturated with sodium at about 3 to 4 wt % sodium. Additional sodium does not significantly increase the reaction rate, and may inhibit the rate at higher conversions. Although the results at 800 degrees Celsius contain more data scatter, they appear to show the same trend. Any inhibition effect of the Na at higher catalyst concentration is more pronounced at this higher gasification temperature and becomes more evident at higher conversions. As typified by the 4 wt % Na trajectory shown in FIG. 10, this sample had the highest initial rates, but tailed off and fell below the conversion of the 3 wt % Na sample as conversion increased at longer times.

Added sodium clearly increases the reaction rate. With added sodium, the gasification rate appears to be dominated by sodium-catalyzed sites. This tends to make the active sites more uniform, and allows a simple model, like the random pore model, to more closely correlate the gasification rate results.

No modifications of the random pore model were needed to correlate the results. This may be because the sodium levels in most of our experiments were sufficient to saturate the active sites. A catalytic site on the coal surface consists of two parts, the catalytic metal and the organic functional group to which the metal is attached. This is generally thought to be a carboxylic or hydroxyl group. If the level of sodium is sufficiently high, then the number of catalytic sites is limited by the density of the organic functional groups rather than the sodium level. The surface density of these organic groups may be proportional to the pore surface area, which is the basis of the random pore mode. The possible inhibition effect observed at higher Na contents and higher conversions is consistent with excessive and increasing Na surface coverage that physically blocks the organic material from reacting with the steam.

Effect of Temperature

Figure 12:
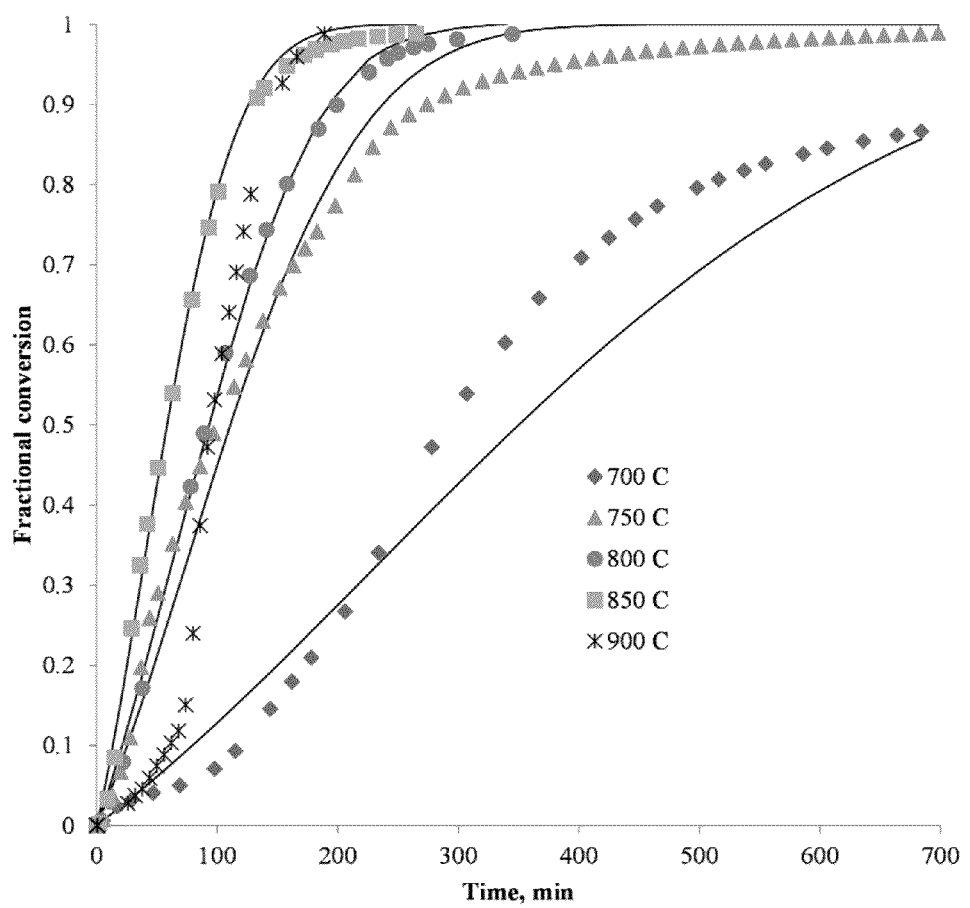
FIG. 12 is a graph showing the effect of temperature on non-catalytic gasification and the corresponding random pre model.
Figure 13:
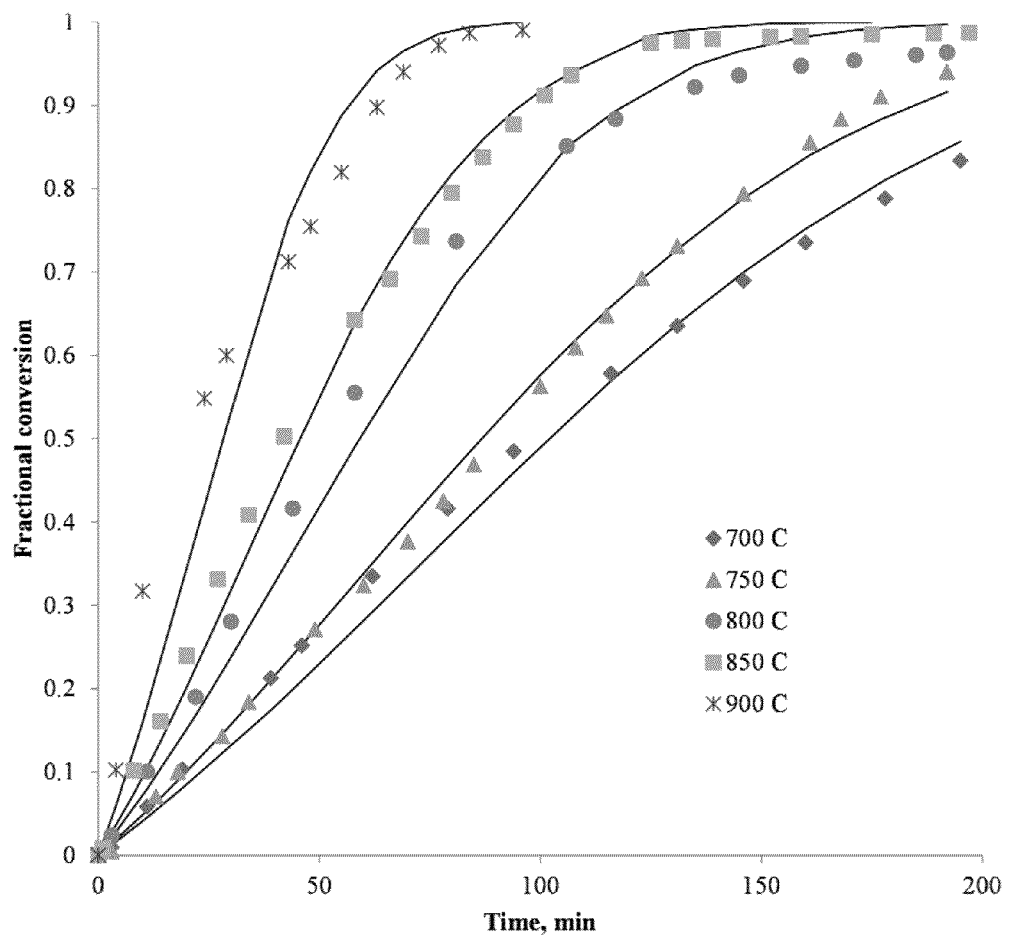
FIG. 13 is a graph showing the effect of temperature on catalytic gasification and the corresponding random pre model fits.

FIG. 12 shows the effect of temperature on gasification with no added catalyst. The gasification rate increases with increasing temperature, as expected, except for the 900 degrees Celsius experiment, which gave unexpected results. The data fit shown in FIG. 12 is not as good as was obtained for most experiments with an added catalyst. FIG. 13 shows the effect of temperature with 5 wt % added sodium catalyst. Note that FIG. 13 has a much shorter time scale than FIG. 12, consistent with the catalytic effect of the added sodium. In FIG. 13, gasification rates consistently increase with increasing temperature.

The temperature dependence can be modeled using an Arrhenius equation:

$$k_{RP} = A\exp\left(\frac{-E_a}{RT}\right) \tag{E3}$$

where: A=pre-exponential constant,
$E_a$=activation energy,
R=gas constant, and
T=absolute temperature Taking the log of both sides of E3 yields:

$$\ln(k_{RP}) = \ln(A) - \frac{E_a}{RT} \tag{E4}$$

A plot of $\ln(k_{RP})$ versus 1/T, the well-known Arrhenius plot, should yield a straight line with slope $-E_a/R$ and intercept $\ln(A)$.

Figure 14:
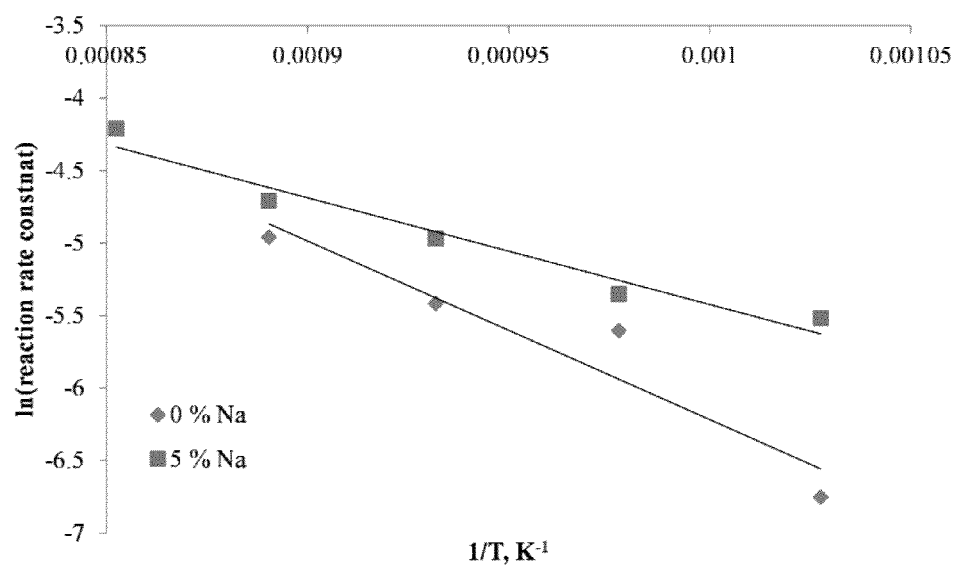
FIG. 14 is an Arrhenius plot showing the effect of temperature on the gasification reaction rate constant, kRP.

FIG. 14 shows the Arrhenius plot. The reaction rate with 5 wt % added sodium is consistently higher than the rate with no added catalyst. With 5 wt % added sodium, the activation energy, $E_a$, is 61.2 kJ/mole and the pre-exponential constant, A, is 6.93 $min^{-1}$. The kinetic constant for 900 degrees Celsius with no added catalyst is not shown in FIG. 9 because this experiment gave atypical results. A linear fit to the points with no added catalyst gives an $E_a$, value of 102.3 kJ/mole and an A value of 442 $min^{-1}$. The scatter evident in FIG. 14 suggests that these uncatalyzed values are less reliable.

For our work, the coal particle diameter was fairly small (<74 μm), which is known to influence the gasification behavior by generally increasing gasification rates. The small particle size and the low gasification temperatures allowed the use of a kinetic model that assumes no mass transfer restrictions. Also, sub-bituminous coals are more reactive for gasification than carbon and higher ranked coals. The combination of small particles, sub-bituminous coal, and sodium catalyst gave a relatively low activation energy of 61.2 kJ/mole. This is significantly lower than apparent activation energies previously reported in the range of about 75 kJ/mol to about 260 kJ/mol for various samples with particle sizes ranging from 20 μm to 600 μm.

CONCLUSION

Sodium carbonate (soda ash) is an effective and inexpensive char gasification catalyst. Wyodak low sulfur sub-bituminous coal (particle diameters of <74 μm) was gasified at temperatures between 700 and 900 degrees Celsius with of 0-5 wt % $Na_2CO_3$ added by incipient wetness impregnation. Sodium is active during pyrolysis, as shown by analysis of TGA data.

Sodium carbonate greatly accelerates the steam char gasification rate. The results suggest that the catalytically active sites in the coal may become saturated by sodium at about 3 wt % sodium content and that additional catalyst may block access to the active sites. The random pore model, without modifications, provided an excellent fit to the conversion versus time data, especially when sodium was added as a catalyst. This model assumes no mass transfer restrictions, and this is appropriate for the small particles and low temperatures used in this investigation. With 5 wt % added sodium, the activation energy was 61.2 KJ/mole, a much lower activation energy than reported by most gasification kinetic studies.

While the foregoing is directed to embodiments of the present invention, other and further embodiments of the invention may be devised without departing from the basic scope thereof, and the scope thereof is determined by the claims that follow.

The invention claimed is:

1. A coal gasification method, comprising:
   forming a reaction mixture comprising a coal derived solid and a single catalyst consisting of aqueous sodium carbonate by mixing the coal derived solid and the single catalyst, wherein the single catalyst is present in the reaction mixture at a concentration no higher than about 5 wt %;
   heating the reaction mixture to a target temperature between about 700° C. and about 900° C.;
   maintaining the reaction mixture at a pressure below 1 atm.;
   contacting the reaction mixture with water vapor; and
   forming carbon monoxide from the reaction mixture.

2. The coal gasification method of claim 1, further comprising disposing the reaction mixture in a fixed bed gasifier.

3. The coal gasification method of claim 1, further comprising contacting the reaction mixture with nitrogen.

4. The coal gasification method of claim 1, wherein the reaction mixture is maintained at the target temperature for a time between about 100 minutes and about 2,000 minutes.

5. The coal gasification method of claim 1 wherein the reaction mixture is maintained at a pressure between about 0.75 atm. and 1 atm.

6. A coal gasification method, comprising:
   forming a reaction mixture comprising a coal derived powder and a single catalyst consisting of powdered sodium carbonate by mixing the coal derived powder and the single catalyst;
   heating the reaction mixture to a target temperature between about 700° C. and about 900° C.;
   contacting the reaction mixture with steam;
   flowing the reaction mixture and the steam into a gasifier;
   flowing nitrogen into the gasifier;
   maintaining a pressure of the gasifier below 1 atm.; and
   forming carbon monoxide from the reaction mixture.

7. The coal gasification method of claim 6, wherein the reaction mixture contains from about 1 wt % to about 5 wt % of the single catalyst.

8. The coal gasification method of claim 6, wherein the gasifier is a fixed bed gasifier.

9. The coal gasification method of claim 6, further comprising maintaining the reaction mixture at the target temperature for a time between about 100 minutes and about 3,000 minutes.

10. The coal gasification method of claim 6, wherein the carbon monoxide is a component of a product gas mixture formed from the reaction mixture, and the carbon monoxide is at least about 20% by volume of the product gas mixture within the first 100 minutes of gasification.

11. The coal gasification method of claim 10, wherein the reaction mixture contains from about 1 wt % to about 5 wt % of the single catalyst.

12. The coal gasification method of claim 10, wherein the product gas mixture has a concentration of methane less than about 0.5% by volume after 50 minutes of gasification.

13. A method of forming carbon monoxide from coal, comprising:
   forming a reaction mixture comprising a powdered coal having a moisture content of at least about 10 wt % and from about 1 wt % to about 5 wt % of a single catalyst consisting of powdered sodium carbonate by mixing the coal and the single catalyst;
   blending a stoichiometric excess of water vapor with the reaction mixture;
   disposing the reaction mixture in a gasifier;
   adding nitrogen to the gasifier;
   maintaining a temperature of the reaction mixture between about 700° C. and about 900° C. for no more than about 5000 minutes;
   maintaining a pressure of the gasifier below about 1 atm.; and
   withdrawing a gas comprising carbon monoxide from the gasifier.

14. The method of claim 13, wherein the water vapor is provided at a stoichiometric excess no more than about 200%.

15. The method of claim 13, wherein the gas has at least about 20 vol % carbon monoxide within the first 100 minutes of gasification.

16. A coal gasification method, comprising:
- forming a reaction mixture comprising a coal derived solid and a single catalyst comprising 99.8 wt % sodium carbonate by mixing the coal derived solid and the single catalyst, wherein the single catalyst is present in the reaction mixture at a concentration between about 3 wt % and about 4 wt %;
- heating the reaction mixture to a target temperature between about 700° C. and about 900° C.;
- disposing the reaction mixture in a fixed bed gasifier;
- contacting the reaction mixture with nitrogen;
- maintaining the reaction mixture at a pressure below 1 atm.;
- contacting the reaction mixture with water vapor; and
- forming carbon monoxide from the reaction mixture.

\* \* \* \* \*

UNITED STATES PATENT AND TRADEMARK OFFICE
CERTIFICATE OF CORRECTION

PATENT NO. : 8,926,931 B2
APPLICATION NO. : 13/566492
DATED : January 6, 2015
INVENTOR(S) : Fan et al.

It is certified that error appears in the above-identified patent and that said Letters Patent is hereby corrected as shown below:

In the Specification

In Detailed Description:

Column 10, Line 24, please delete "X" and insert --$X$-- therefor;

Column 10, Line 25, please delete "t" and insert --$t$-- therefor;

Column 10, Line 26, please delete "$k_{SC}$" and insert --$k_{SC}$-- therefor;

Column 10, Line 35, please delete "ln" and insert --$ln$-- therefor;

Column 10, Line 38, please delete "$k_{RP}$" and insert --$k_{RP}$-- therefor;

Column 10, Line 40, please delete " $\psi$ " and insert -- $\psi$ -- therefor;

Column 10, Line 42, please delete " $\psi$ " and insert -- $\psi$ -- therefor;

Column 10, Line 45, please delete " $\psi$ " and insert -- $\psi$ -- therefor;

Column 11, Line 1, please delete " $\psi$ " and insert -- $\psi$ -- therefor;

Column 11, Line 2, please delete " $\psi$ " and insert -- $\psi$ -- therefor;

Column 11, Line 7, please delete " $\psi$ " and insert -- $\psi$ -- therefor;

Column 12, Line 6, please delete "$k_Rp$" and insert --$k_{RP}$-- therefor;

Column 12, Line 61, please delete "exp" and insert --$exp$-- therefor;

Signed and Sealed this
Thirtieth Day of June, 2015

Michelle K. Lee
*Director of the United States Patent and Trademark Office*

CERTIFICATE OF CORRECTION (continued)
U.S. Pat. No. 8,926,931 B2

Column 12, Line 64, please delete "A" and insert --$A$-- therefor;

Column 12, Line 65, please delete "$E_a$" and insert --$E_a$-- therefor;

Column 12, Line 66, please delete "R" and insert --$R$-- therefor;

Column 12, Line 67, please delete "T" and insert --$T$-- therefor;

Column 13, Line 5, please delete "ln($k_{RP}$)" and insert --$ln(k_{RP})$-- therefor;

Column 13, Line 7, please delete "ln($k_{RP}$)" and insert --$ln(k_{RP})$-- therefor;

Column 13, Line 7, please delete "1/T" and insert --$1/T$-- therefor;

Column 13, Line 8, please delete "–$E_a$/R" and insert -- –$E_a/R$-- therefor;

Column 13, Line 9, please delete "In(A)" and insert --$ln(A)$-- therefor;

Column 13, Line 13, please delete "$E_a$" and insert --$E_a$-- therefor;

Column 13, Line 14, please delete "A" and insert --$A$-- therefor;

Column 13, Line 17, please delete "$E_a$" and insert --$E_a$-- therefor;

Column 13, Line 18, please delete "A" and insert --$A$-- therefor.